(12) United States Patent
Tzeng

(10) Patent No.: US 12,110,670 B1
(45) Date of Patent: Oct. 8, 2024

(54) VOICE-CONTROLLED FAUCET

(71) Applicant: Ncip Inc., Taipei (TW)

(72) Inventor: Rong-Chyan Tzeng, Taipei (TW)

(73) Assignee: NCIP INC., Taipei (TW)

( * ) Notice: Subject to any disclaimer, the term of this patent is extended or adjusted under 35 U.S.C. 154(b) by 67 days.

(21) Appl. No.: 18/194,985

(22) Filed: Apr. 3, 2023

(51) Int. Cl.
    *E03C 1/05* (2006.01)
    *G10L 15/22* (2006.01)

(52) U.S. Cl.
    CPC .............. *E03C 1/057* (2013.01); *G10L 15/22* (2013.01); *G10L 2015/223* (2013.01); *Y10T 137/9247* (2015.04)

(58) Field of Classification Search
    CPC ... E03C 1/057; G10L 15/22; G10L 2015/223; Y10T 137/9247
    USPC .................................................. 137/801–802
    See application file for complete search history.

(56) References Cited

U.S. PATENT DOCUMENTS

| | | | |
|---|---|---|---|
| 5,868,311 A * | 2/1999 | Cretu-Petra | E03C 1/057 236/12.12 |
| 8,572,772 B2 | 11/2013 | Wolf et al. | |
| 9,266,136 B2 | 2/2016 | Klicpera | |
| 10,227,760 B2 * | 3/2019 | Horwitz | E03C 1/057 |
| 10,550,555 B2 * | 2/2020 | Chen | E03C 1/057 |
| 10,887,125 B2 * | 1/2021 | Rexach | E03C 1/055 |
| 10,937,421 B2 | 3/2021 | Beck et al. | |
| 11,176,932 B2 * | 11/2021 | Beck | E03C 1/055 |
| 2018/0216324 A1 * | 8/2018 | Beck | E03C 1/055 |

* cited by examiner

*Primary Examiner* — John Bastianelli
(74) *Attorney, Agent, or Firm* — MUNCY, GEISSLER, OLDS & LOWE, P.C.

(57) ABSTRACT

A voice-controlled faucet includes a spout, a base, a mechanically operated mixing valve assembly, an electrically operable flow control assembly, a sound receiving unit and a speaker unit. The sound receiving unit and the speaker unit include a housing structure with enhanced water protection for the electronic components inside, respectively.

10 Claims, 9 Drawing Sheets

VOICE-CONTROLLED FAUCET

FIELD OF THE INVENTION

The disclosure generally relates to a voice-controlled faucet, in particular to a voice-controlled faucet with enhanced water protection for the electronic components.

BACKGROUND OF THE INVENTION

Generally, flow and temperature of water supplied from faucet can be toggled and changed by control of the valve, which is adjusted by moving the handle or the knob by the user.

For most of the faucet, the user must use its hands, arms, or other bodily parts to contact and operate the faucet, which may cause transmission of bacteria, germs, viruses, greases, or other contaminants, leading to hygiene or other concerns. The above-identified problem is partially addressed in many prior art solutions. As one simple solution, a near-end sensing component or a voice control component is added in the faucet such that the faucet can be operated in a hands-free or touchless manner.

These type of faucets can be found in U.S. Pat. No. 10,937,421 B2 and U.S. Pat. No. 9,266,136 B2. In such faucets, the electronic components mounted in the faucets are at least partially exposed to the environment, which may be subjected to the water splashes or droplets. For the faucet with proximity sensing, the exposed sensor may be contaminated such that its functionality is adversely affected. For the faucet with voice control, the exposed microphone may be damaged or potentially inoperative due to water or moisture intrusion.

Therefore, a need exists for a faucet equipped with the electronic components having increasing water protection.

SUMMARY OF THE INVENTION

A voice-controlled faucet described and comprises a spout, a base, a mechanically operated mixing valve assembly, an electrically operable flow control assembly, a sound receiving unit and a speaker unit.

The base is configured to support the spout and comprises an outer cylindrical wall extending vertically and defining an internal space, a first opening penetrating a first side of the outer cylindrical wall and a second opening penetrating a second side of the outer cylindrical wall, which is opposite to the first side. The mechanically operated mixing valve assembly is provided in the internal space. The electrically operable flow control assembly is disposed beneath the base and includes a controller and an electrically activated valve controlled by the controller, which is fluidly coupled in series with and downstream from the mechanically operated mixing valve assembly, the electrically activated valve is fluidly coupled to a nozzle of the spout for dispensing water. The sound receiving unit is fixed to the base and electrically connected to the controller, the sound receiving unit comprises a first housing and a microphone assembly. The first housing comprises a first back panel, a first lid covered on the first back panel and a first space formed therebetween. The first lid comprises one or more tapered through-holes penetrating in a thickness direction, the tapered through-hole comprises an outer opening, an inner opening smaller than the outer opening and a cylindrical wall tapering from the outer opening to the inner opening. The microphone assembly is disposed in the first space and electrically connected to the electrically operable flow control assembly, the microphone assembly comprises one or more microphones laterally align with the one or more tapered through-hole. The speaker unit is fixed to the base and electrically connected to the sound receiving unit, the speaker unit comprises a second housing and one or more speaker units. The second housing is disposed in the second opening and comprises a second back panel, a second lid covered the second back panel and a second space formed therebetween, the second lid comprises a plurality of first perforations and a plurality of second perforations penetrating in a thickness direction, the plurality of first perforations located above the plurality of second perforations, and the plurality of second perforations are disposed close to a lower edge of an inner brim of the second lid and extended along an upper plane of the lower edge of the inner brim of the second lid so as to form a drainage path away from the second space to outside. The one or more speaker units located within the second space and disposed corresponding to the plurality of first perforations.

DETAILED DESCRIPTION OF THE PREFERRED EMBODIMENTS

Terms used herein are merely based on illustration of specific embodiments and are not intended to limit the invention. As used herein, the singular forms "a", "an", and "the" include the plural forms as well, unless the context clearly indicates otherwise.

Directional terms used herein, for example, upper, lower, left, right, front, back and derivatives or synonyms thereof, relate to the orientations of elements in the accompanying drawings and are not intended to limit the disclosure. In some circumstances, elements of the forms described herein may be assembled in orientations different from those in which they are ultimately used to accept concrete. However, for ease of explanation, directional terms are used in the description to describe the assembly of these form elements. Accordingly, the directional terms used herein should not be understood in a literal sense but rather in a sense used to facilitate explanation and/or directions relative to one another.

Figure 1:
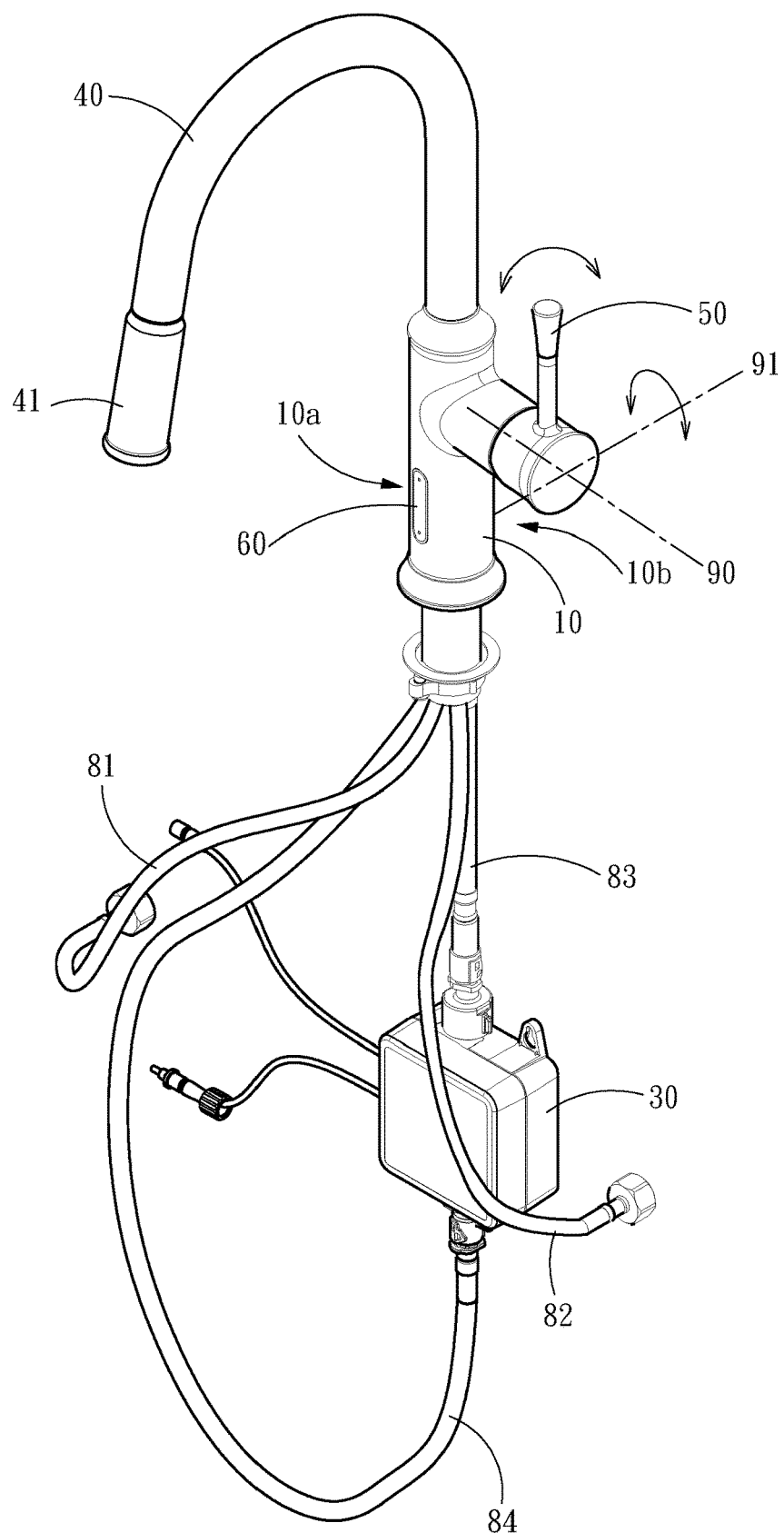
FIG. 1 is a perspective view of an embodiment of the faucet.
Figure 2:
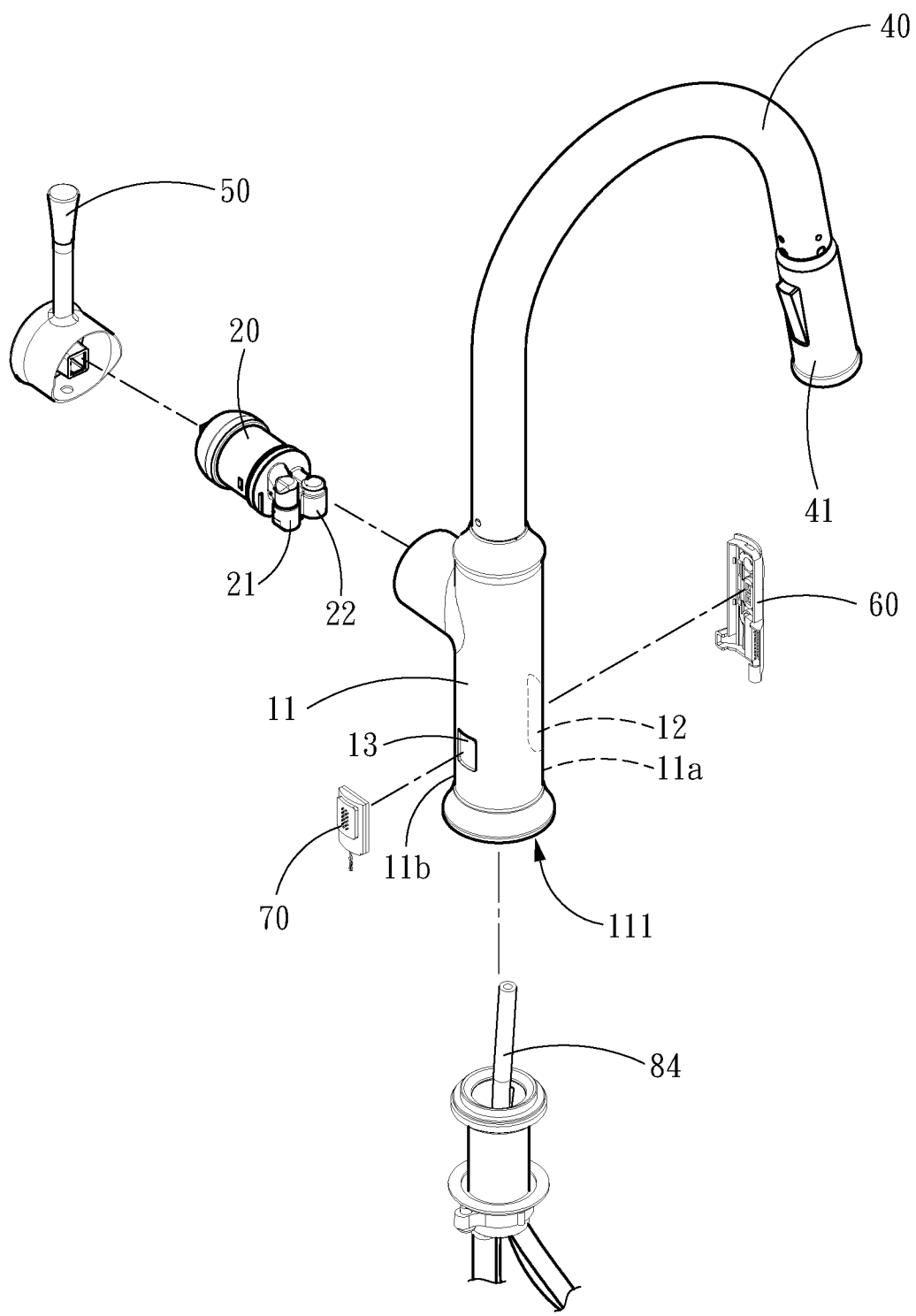
FIG. 2 is a partially exploded schematic diagram of the embodiment of the faucet.

Referring to FIG. 1 and FIG. 2, the disclosure provides a voice-controlled faucet, comprising a base 10, a mechanically operated mixing valve assembly 20, an electrically operable flow control assembly 30, a spout 40, a handle 50, a sound receiving unit 60 and a speaker unit 70. The base 10 is mounted or fixed on a top surface of a wash basin in a restroom, the mechanically operated mixing valve assembly 20 is disposed inside the base 10. The electrically operable flow control assembly 30 and the base 10 are disposed separately from each other, and the electrically operable flow control assembly 30 is mounted below the top surface of the wash basin. The spout 40 is mounted on and supported by the base 10 and includes a nozzle 41.

The sound receiving unit 60 is fixed to the base 10 and electrically connected to the electrically operable flow control assembly 30. The sound receiving unit 60 receives an acoustic signal from a user, then the electrically operable flow control assembly 30 based on the acoustic signal to perform a specific operation. The speaker unit 70 is fixed to the base 10 and may be electrically connected to the sound receiving unit 60 and/or the electrically operable flow control assembly 30. The speaker unit 70 may output a sound signal, such as buzzes, audio messages and so on, to notify or alert the user. Alternatively, the speaker unit 70 may output a sound signal in response to the specific operation or the acoustic signal from the user.

The sound receiving unit 60 and the speaker unit 70 are located on opposing sides of the base 10 respectively, and preferably, the sound receiving unit 60 and the speaker unit 70 are located on a front in side 10a and a back side 10b of the base 10 respectively, such that the sound receiving unit 60 is prevented from being interfered by a sound outputted by the speaker unit 70.

As shown in FIG. 2, the base 10 comprises an outer cylindrical wall 11, a first opening 12 and a second opening 13. The outer cylindrical wall 11 extends vertically and defines an internal space 111. The first opening 12 and the second opening 13 are separately and laterally penetrated through a front surface 11a and a rear surface 11b of the outer cylindrical wall 11, and the second opening 13 is located opposite to the first opening 12. The sound receiving unit 60 is provided in the first opening 12, and the speaker unit 70 is provided in the second opening 13.

The mechanically operated mixing valve assembly 20 is disposed in the internal space 111. The mechanically operated mixing valve assembly 20 comprises a cold water inlet 21, a hot water inlet 22 and an mixed water outlet (not shown). The cold water inlet 21 and the hot water inlet 22 fluidly coupled to a cold water source and a hot water source via a cold water pipeline 81 and a hot water pipeline 82, respectively. The mechanically operated mixing valve assembly 20 receives cold water and hot water from the cold water source and the hot water source and outputs a mixed water from the mixed water outlet. The mechanically operated mixing valve assembly 20 is operatively coupled to the handle 50.

The handle 50 is capable of rotating about a first axis 90 to operate the mechanically operated mixing valve assembly 20 to perform mixing of hot and cold water, for adjust the ratio of flow of the cold water and the hot water to change the temperature of the mixed water. In addition, the handle 50 is capable of pivoting about a second axis 91 from an off position towards a maximum on position to operate the mechanically operated mixing valve assembly 20, for controlling the flow of the mixed water from the mixed water outlet. The flow rate of the mixed water can be controlled from the off position (0% flow) to the maximum on position (100% flow) position, or at flow rates therebetween by pivoting the handle 50 between the off and maximum on positions.

Figure 3:
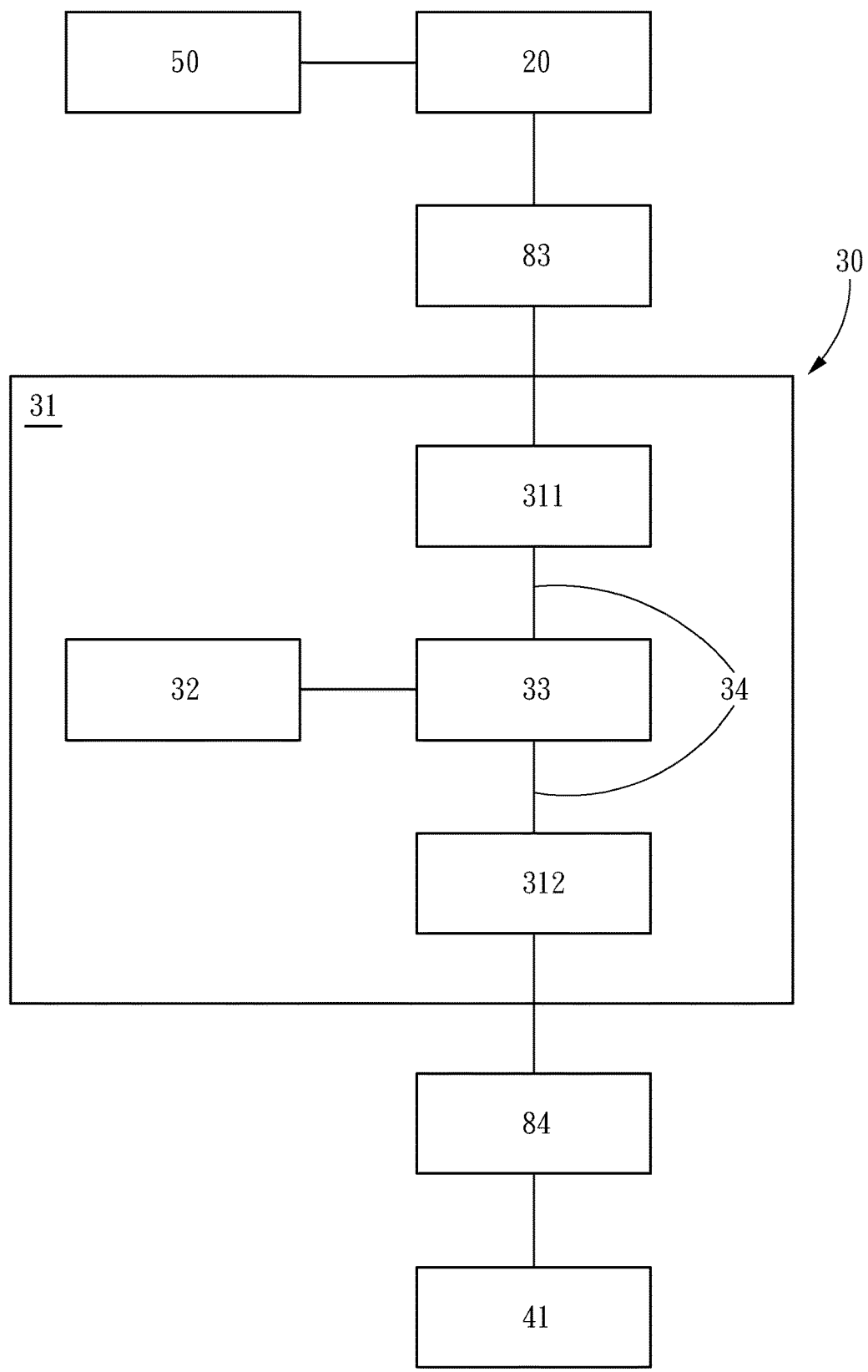
FIG. 3 illustrates a block diagram of the electrically operable flow control assembly.

FIG. 3 illustrates a block diagram of the electrically operable flow control assembly 30 and its connection with the other parts of the faucet. The electrically operable flow control assembly 30 includes a box 31, a controller 32 and an electrically activated valve 33. The controller 32 and the electrically activated valve 33 are disposed inside the box 31, which has an inlet connector 311 and an outlet connector 312. The inlet connector 311 is fluidly coupled to a first tube 83 to receive a downstream from the mechanically operated mixing valve assembly 20. The outlet connector 312 is fluidly coupled to a second tube 84 for connecting to the nozzle 41 of the spout 40 for dispensing water into sink. Inside the box 31, the electrically activated valve 33 is fluidly coupled on a waterway between the inlet connector 311 and the outlet connector 312 so as to control the flow from the inlet connector 311 to the outlet connector 312.

In an example, the electrically operable flow control assembly 30 may further include a conduit 34 disposed inside the box 31 and connected between the inlet connector 311 and the outlet connector 312. The electrically activated valve 33 is mounted on the conduit 34 and in fluid communication with the inlet connector 311 and the outlet connector 312. The electrically activated valve 33 controls the flow in the conduit 34 from the inlet connector 311 to the outlet connector 312.

The electrically activated valve 33 may be an electromechanical valve, such as a solenoid on-off valve that is electrically driven. The solenoid on-off valve opens or closes a flow path between the inlet connector 311 and the outlet connector 312 based on a control signal sent from the controller 32.

The controller 32 may operate suitable software constituting a voice recognition engine to achieve voice control of the electrically activated valve 33. For example, when a verbal "on" instruction received at the sound receiving unit 60, then the controller 32 may generate or select a command to turn on the electrically activated valve 33 such that the mixed water is allowed to flow through the electrically operable flow control assembly 30; when a verbal "off" instruction received at the sound receiving unit 60, then the controller 32 may generate or select a command to turn off the electrically activated valve 33 so as to stop the flow through the electrically operable flow control assembly 30.

In operation, to turn on the flow of the mixed water, the user may move the handle 50 from the off position to an on position, which is between the off position and the maximum on position, to allow flow through the mechanically operated mixing valve assembly 20, then the user may speak a voice command to trigger the controller 32 to open the electrically activated valve 33 to disperse the mixed water from the nozzle 41.

When shutting off the flow of the mixed water, the user may either move the handle 50 to the off position or speak a voice command to instruct the controller 32 to close the electrically activated the valve 33 to stop the mixed water disperse from the nozzle 41.

Figure 4A:
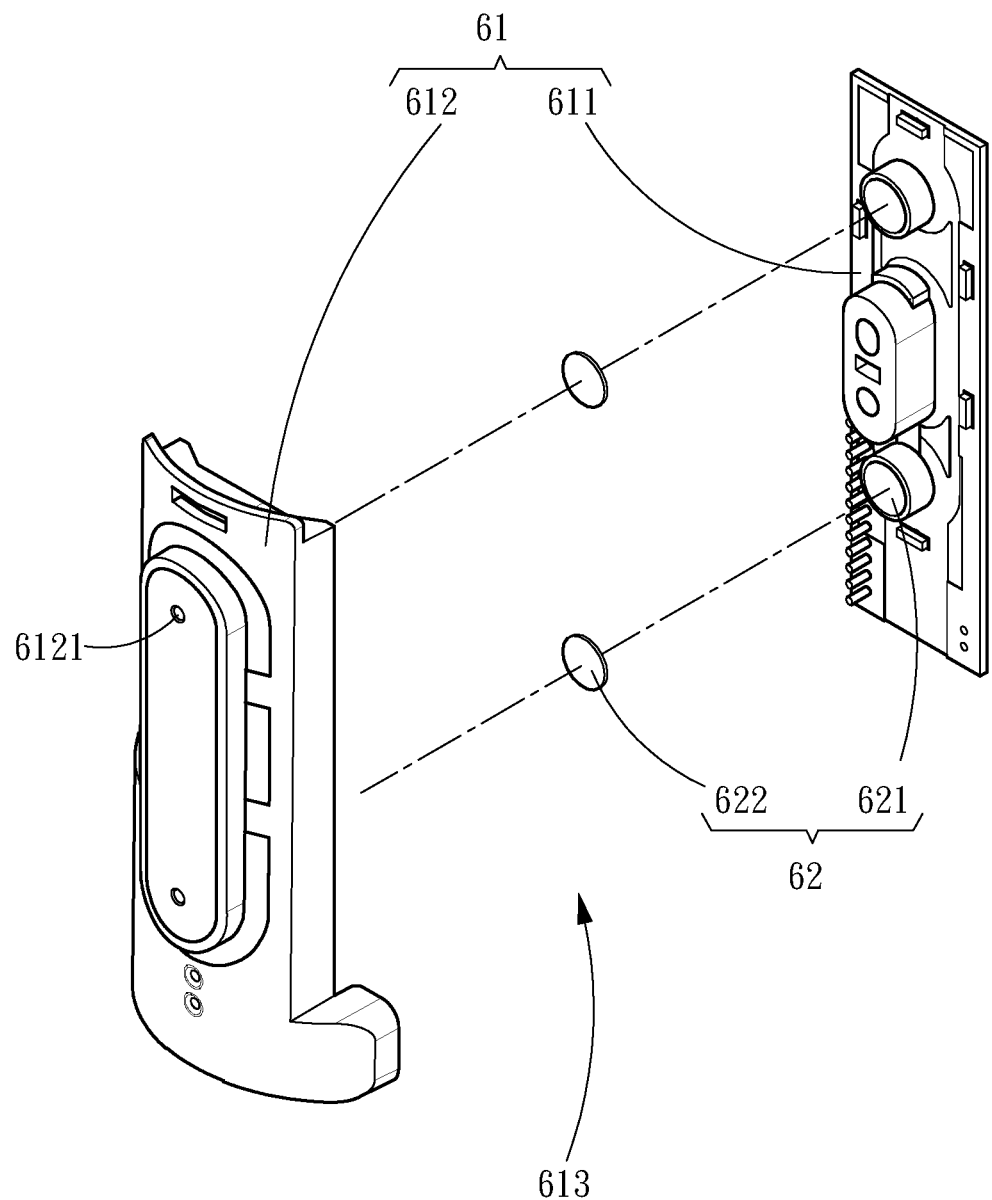
FIG. 4A, FIG. 4B, and FIG. 4C illustrate different views of the sound receiving unit of the embodiment of the faucet.
Figure 4B:
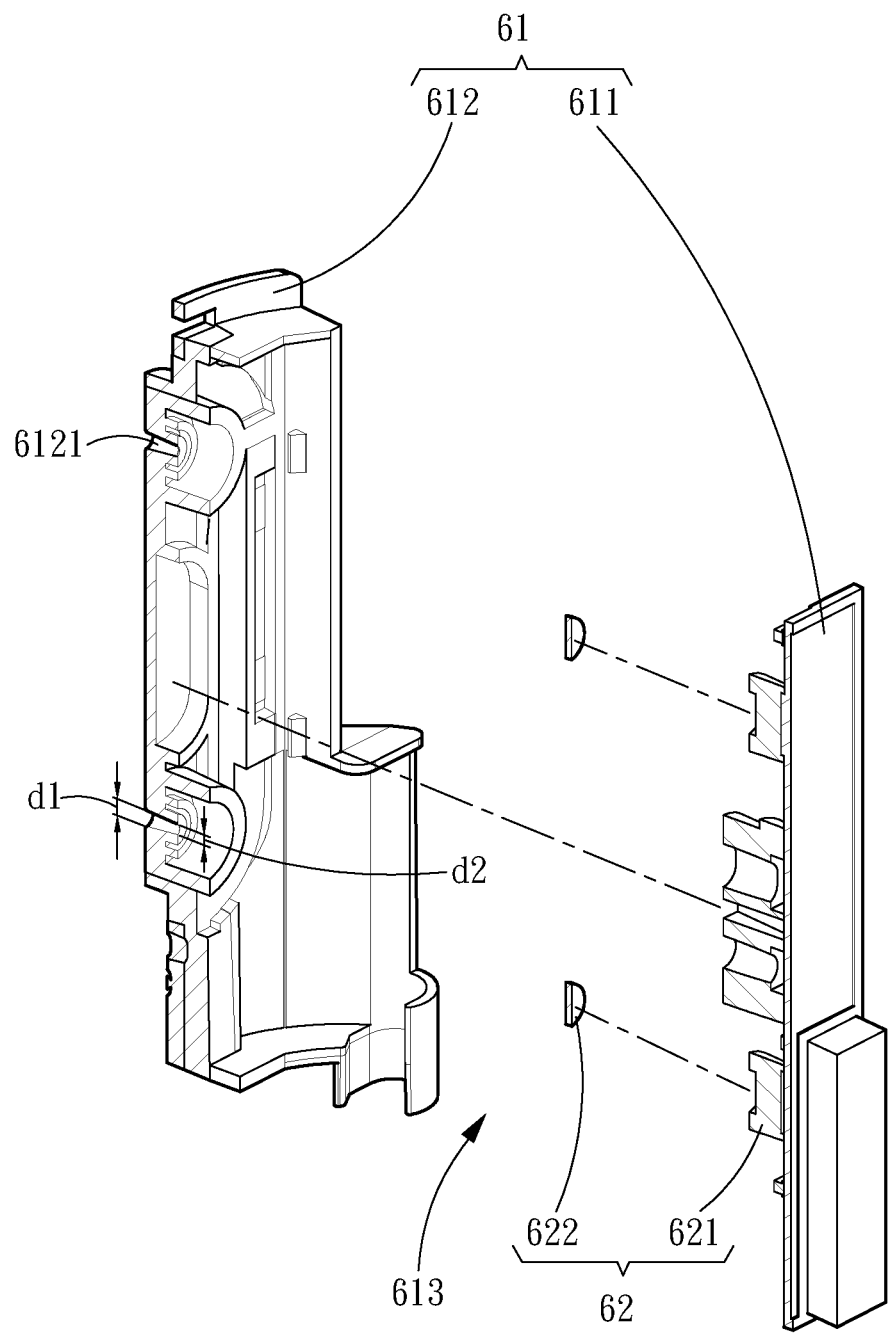
Figure 4C:
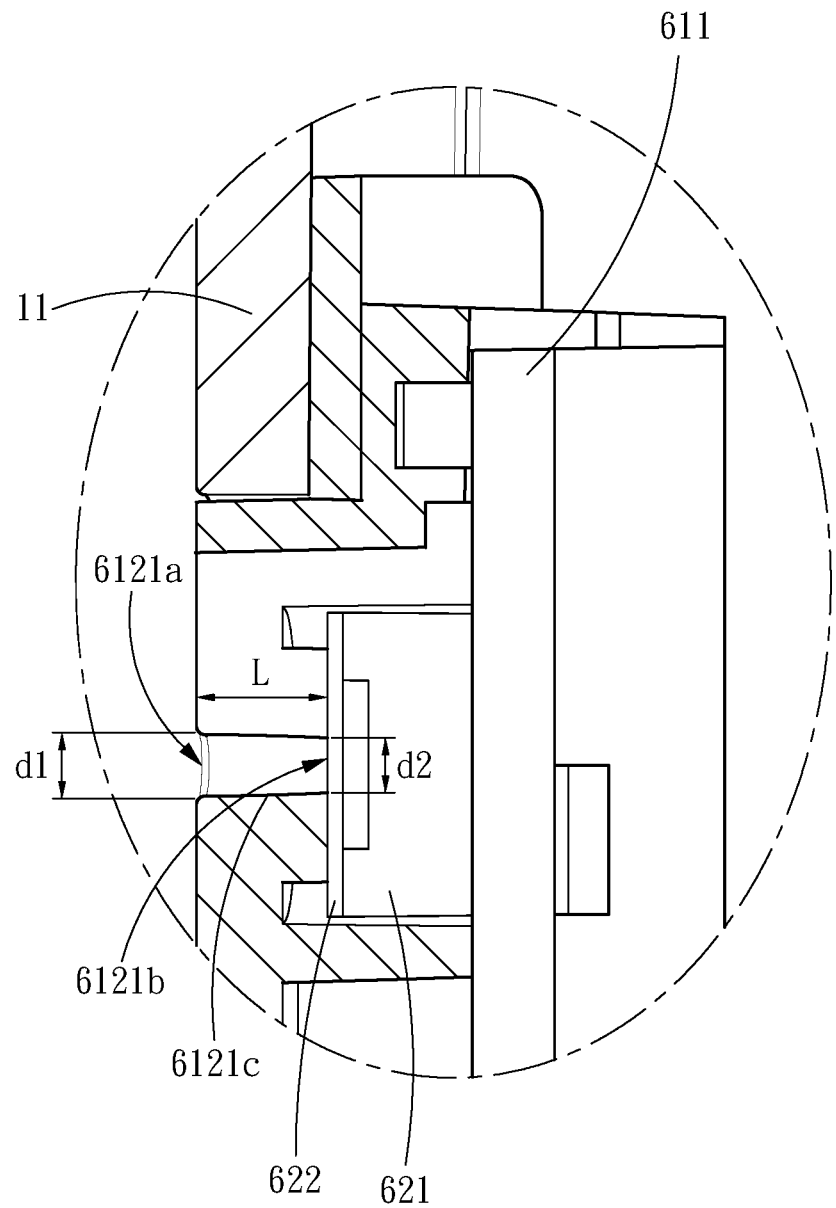

Referring to FIG. 4A, FIG. 4B, and FIG. 4C, the sound receiving unit 60 comprises a first housing 61 and one or more microphone assemblies 62. The first housing 61 comprises a first back panel 611 and a first lid 612, which are mounted on the first opening 12. The first lid 612 is assembled with and is covered on the first back panel 611, and a first space 613 is formed. In the embodiment, the first lid 612 comprises one or more tapered through-holes 6121 laterally formed to penetrate in a thickness direction.

As shown in FIG. 4C, each of the one or more tapered through-holes 6121 includes an outer opening 6121a formed on a front side, an inner opening 6121b formed on a rear side and a cylindrical wall 6121c. The outer opening 6121a has a first diameter d1 larger than a second diameter d2 of the inner opening 6121b. And the cylindrical wall 6121c is tapered from the outer opening 6121a to the inner opening 6121b for a distance L and has a half-cone angle. In an example, the first diameter d1 is in a range between 1.0 mm and 2.0 mm, the second diameter d2 is in a range between 0.5 mm and 1.0 mm. In one embodiment, the first diameter d1 is 1.7 mm, the second diameter d2 is 1.3 mm, the distance L is 3 mm, and the half-cone angle is 2 degree. The tapered through-hole 6121 could promote quality of audio signals captured by the microphone array inside the first space 613. Meanwhile, outward sloping of the cylindrical wall 6121c of the one or more tapered through-holes 6121 provides effective water shedding and is configured to facilitate water droplets departure and sliding off, preventing water droplets from staying in the tapered through-hole 6121. In the embodiment, the number of the one or more tapered through-holes 6121 is two, but the disclosure is not limited thereto.

The one or more microphone assemblies 62 are installed in the first space 613. As shown in FIG. 4B, the one or more microphone assemblies 62 are fastened on the first back panel 611 and laterally align with the one or more tapered through-holes 6121. The microphone assembly 62 comprises one or more microphones 621 and one or more waterproof membranes 622. The waterproof membrane 622 is affixed to the microphone 621 and is located between the tapered through-hole 6121 and the microphone 621 to avoid water damage caused by the liquid and moisture inside the first space 613. The one or more waterproof membranes 622 can provide an additional seal against liquid penetration to the one or more microphones 621.

In one embodiment, the first back panel 611 is integrated with a circuit board, and the one or more microphones 621 are electronically connected to the circuit board to send a signal, based on the voice command from the user, to the electrically operable flow control assembly 30.

Figure 5A:
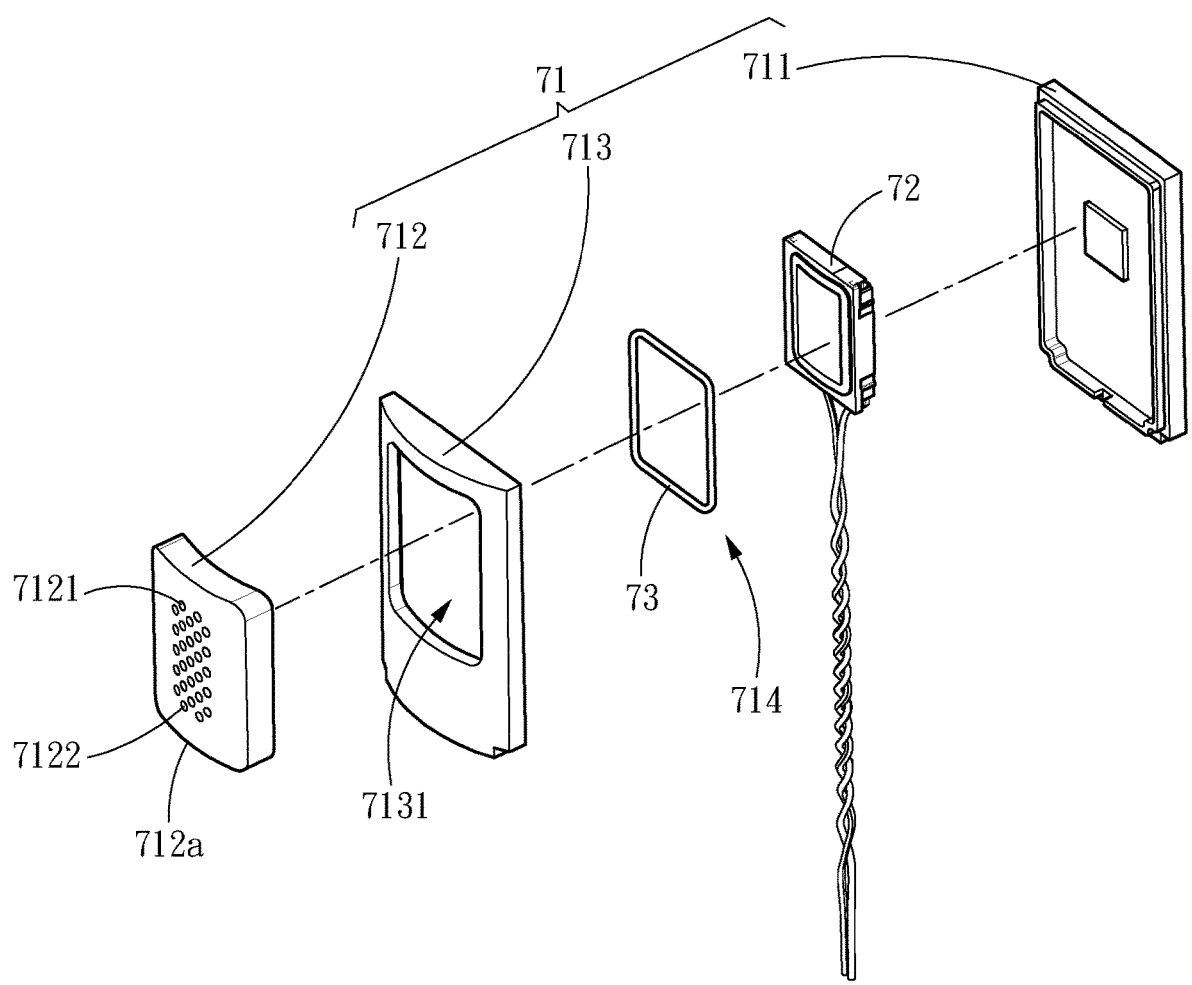
FIG. 5A, FIG. 5B, and FIG. 5C illustrate different views of the speaker unit of the embodiment of the faucet.
Figure 5B:
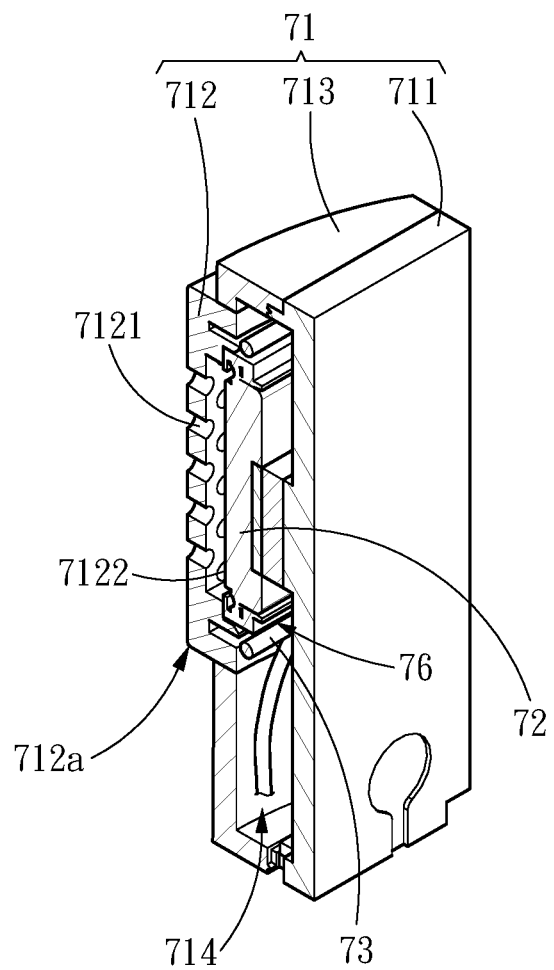

Referring to FIG. 5A and FIG. 5B, the speaker unit 70 comprises a second housing 71, one or more speakers 72 and a sealing ring 73. The second housing 71 is disposed upright in the second opening 13, and the second housing 71 comprises a second back panel 711, a second lid 712 and a front panel 713. The second lid 712 is mounted on an opening 7131 of the front panel 713 which is fixed to the second back panel 711 and a second space 714 is formed inside. The second lid 712 covers the second back panel 711.

Figure 5C:
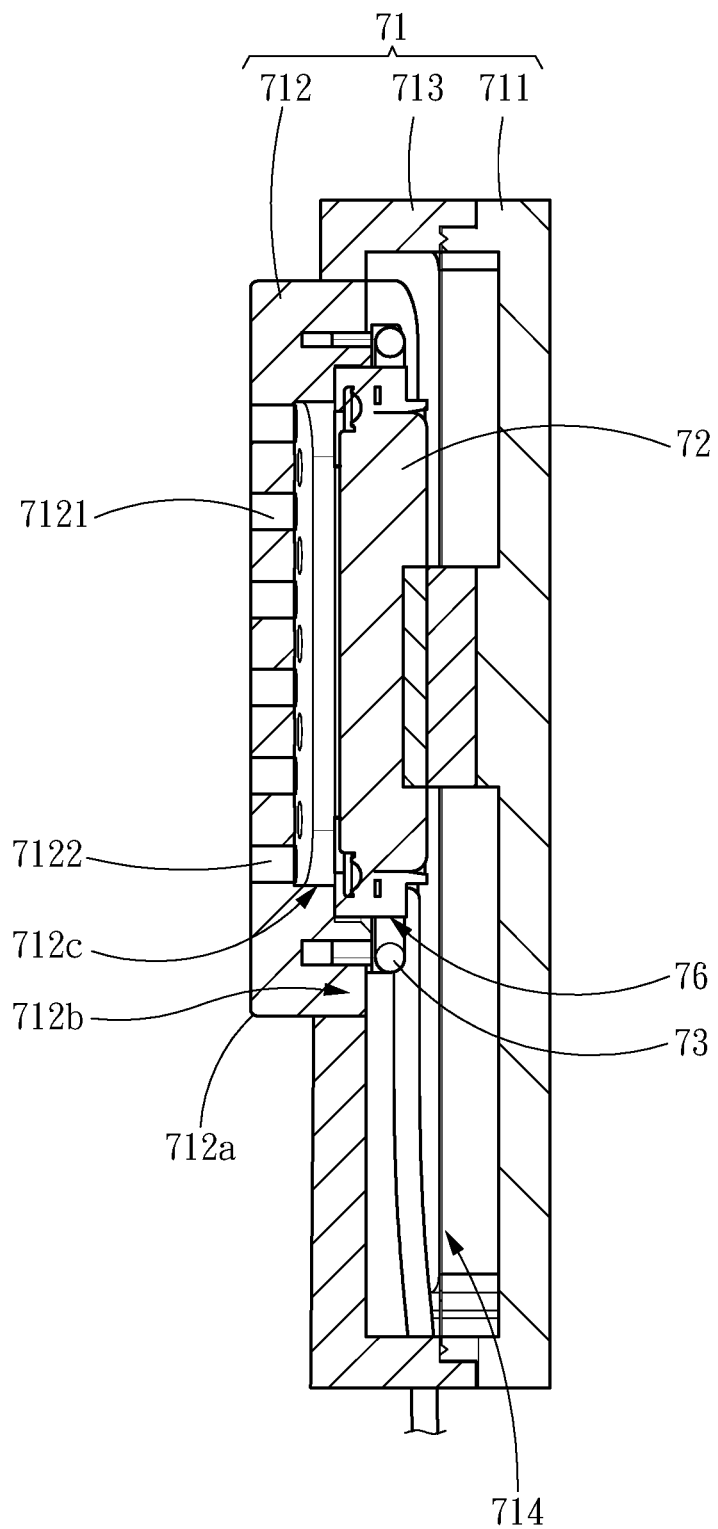

Further, the second lid 712 includes a plurality of first perforations 7121 and a plurality of second perforations 7122 penetrating the second housing 71. The plurality of first perforations 7121 are disposed above the plurality of second perforations 7122. The plurality of first perforations 7121 are configured to serve as a sound propagation path, while the plurality of second perforations 7122 are configured to drain water contained in the second space 714, which may be infiltrated through the plurality of first perforations 7121. Referring to FIG. 5C, the plurality of second perforations 7122 are disposed close to a lower edge 712a of an inner brim 712b of the second lid 712 and extended along an upper plane 712c of the inner brim 712b of the second lid 712 so as to form a drainage path away from the second space 714 to outside, which guides the water falling down on the upper plane 712c of the lower edge 712a to flow outwardly.

The one or more speakers 72 are located within the second space 714 and is disposed facing the plurality of first perforations 7121, and the one or more speakers 72 are electrically connected to the controller 32 and/or the sound receiving unit 60. The sealing ring 73 is affixed to a ring-shaped contacting edge 76, which is provided between the second lid 712 and the speakers 72 and surrounds the second space 714.

In the embodiment, the one or more speakers 72 and the second lid 712 are spaced apart. The plurality of second perforations 7122 of the second lid 712 and a bottom side of the second space 714 are joined with each other to form a drainage channel. When water infiltrates into the second space 714, the accumulated water can be discharged from the plurality of second perforations 7122 to reduce the liquid content in the second space 714, and the sealing ring 73 of the speakers 72 can provide an additional seal against liquid penetration to the one or more speakers 72.

To sum up, the shell structures of the sound receiving unit and the second housing of the speaker unit efficiently prevents an external liquid (for example, water being splashed when a user operates the faucet) from infiltrating into the interior of the sound receiving unit and the speaker unit to cause damage and loss of function, or to affect the lifetime due to moisture. Further, the tapered through-hole of the sound receiving unit can facilitate water droplets departure and sliding off and prevent water from remaining in the tapered through-hole. The plurality of second perforations of the speaker unit can help purge the residual water in the second space, especially when a diaphragm is vibrated when the speakers produce sound.

What is claimed is:

1. A voice-controlled faucet, comprising:
 a spout;
 a base configured to support the spout, the base comprising:
  an outer cylindrical wall, extending vertically and defining an internal space;
  a first opening, penetrating a first side of the outer cylindrical wall; and
  a second opening, penetrating a second side of the outer cylindrical wall, which is opposite to the first side;
 an electrically operable flow control assembly disposed beneath the base, including a controller and an electrically activated valve controlled by the controller, which is fluidly coupled with a water source and to a nozzle of the spout for dispensing water from the water source;
 a sound receiving unit, fixed to the base and electrically connected to the controller, the sound receiving unit comprising:
  a first housing, disposed in the first opening, the first housing comprising a first back panel, a first lid covered on the first back panel and a first space formed therebetween, wherein the first lid comprises one or more tapered through-holes penetrating in a thickness direction, each of the one or more tapered through-holes comprises an outer opening, an inner opening smaller than the outer opening and a cylindrical wall tapering from the outer opening to the inner opening; and
  one or more microphone assemblies, disposed in the first space and electrically connected to the electrically operable flow control assembly, wherein each of the one or more microphone assemblies comprises one or more microphones laterally align with the one or more tapered through-hole; and
 a speaker unit, fixed to the base and electrically connected to the sound receiving unit, the speaker unit comprising:
  a second housing, disposed in the second opening, comprising a second back panel, a second lid covered the second back panel and a second space formed therebetween, wherein the second lid comprises a plurality of first perforations and a plurality of second perforations penetrating in a thickness direction, wherein the plurality of first perforations located above the plurality of second perforations, and the plurality of second perforations are disposed close to a lower edge of an inner brim of the second lid and extended along an upper plane of the inner brim of the second lid so as to form a drainage path away from the second space to outside; and one or more speakers, located within the second space and disposed corresponding to the plurality of first perforations.

2. The voice-controlled faucet according to claim 1, wherein the first opening is provided on a front side of the outer cylindrical wall, and the second opening is provided on a back side of the outer cylindrical wall.

3. The voice-controlled faucet according to claim 1, wherein the one or more microphone assemblies are disposed on the first back panel.

4. The voice-controlled faucet according to claim 1, wherein the cylindrical wall defines a sloped surface to shed the water away from the one or more microphone assemblies.

5. The voice-controlled faucet according to claim 1, wherein the outer opening of each of the one or more tapered through-holes has a first diameter in a range between 1.0 mm and 2.0 mm, and the inner opening of each of the one or more tapered through-holes has a second diameter in a range between 0.5 mm and 1.5 mm.

6. The voice-controlled faucet according to claim 1, wherein the plurality of first perforations are configured to serve as a sound propagation path for the speaker unit.

7. The voice-controlled faucet according to claim 1, wherein the voice-controlled faucet further comprises a mechanically operated mixing valve assembly provided in the internal space.

8. The voice-controlled faucet according to claim 7, wherein the controller generates or selects a command to turn on the electrically activated valve such that a mixed water from the mechanically operated mixing valve assembly is allowed to flow through the electrically operable flow control assembly and then dispensed through the nozzle of the spout.

9. The voice-controlled faucet according to claim 8, wherein the electrically operable flow control assembly is fluidly coupled in series with and downstream from the mechanically operated mixing valve assembly.

10. The voice-controlled faucet according to claim 8, wherein the mechanically operated mixing valve assembly comprises a cold water inlet, a hot water inlet and an mixed water outlet, the cold water inlet and the hot water inlet are fluidly coupled to a cold water source and a hot water source, respectively.

* * * * *